United States Patent [19]
Winkhaus et al.

[11] 3,753,776
[45] Aug. 21, 1973

[54] METHOD OF REMOVING DEPOSITS FORMED IN BAUXITE EXTRACTION

[75] Inventors: Gunter Winkhaus, Koeln-Suelz; Gerhard Wargalla; Fritz Kampf, both of Luenen, all of Germany

[73] Assignee: Vereinigte Aluminum-Werke Aktiengesellschaft, Bonn, Germany

[22] Filed: Sept. 30, 1970

[21] Appl. No.: 76,996

[30] Foreign Application Priority Data
Sept. 30, 1969 Germany............... P 19 49 287.6

[52] U.S. Cl........................ 134/3, 134/41, 423/625
[51] Int. Cl............................. C23g 1/02, C01f 7/14
[58] Field of Search.................. 23/143; 134/3, 41; 423/625

[56] References Cited
UNITED STATES PATENTS

| | | | |
|---|---|---|---|
| 3,074,823 | 1/1963 | Dobbins............................ | 134/41 X |
| 3,443,992 | 5/1969 | Schmidt et al..................... | 134/3 X |
| 3,497,317 | 2/1970 | Tusche.............................. | 23/143 |
| 3,530,000 | 9/1970 | Searles............................. | 134/41 X |
| 2,049,517 | 8/1936 | Saukaitis.......................... | 134/41 |

FOREIGN PATENTS OR APPLICATIONS

| | | | |
|---|---|---|---|
| 1,988 | 1858 | Great Britain..................... | 23/143 |

*Primary Examiner*—M. Weissman
*Attorney*—Michael S. Striker

[57] ABSTRACT

In the continuous extraction of bauxite with sodium aluminate liquor wherein the bauxite is decomposed at a temperature above 180°–200°C, a deposit forms on the walls of the vessel. The deposit, more than 50 percent of which may consist of titanium dioxide, is difficult to remove. It has been found that this deposit can be removed by treatment with a mixture of hydrochloric and hydrofluoric acids when moved continuously over the surface of the deposit. It has also been found that the deposit can be removed with high-velocity jets of water, preferably containing a surface-tension reducing agent. Deposits formed at temperatures below 180°–200°C consist principally of sodium aluminum silicate and can be removed with hydrochloric or sulfuric acid.

7 Claims, No Drawings

METHOD OF REMOVING DEPOSITS FORMED IN BAUXITE EXTRACTION

BACKGROUND OF THE INVENTION

In our own, older German patent No. P 15 92 194.5, a process is described in which a bauxite suspension is passed through a decomposition vessel at a velocity of 0.5 to 7 m/sec or even higher speeds, but preferably between 2 and 5 m/sec. A volume of about 0.01 to 0.5 m³/day/European ton of produced oxide is applied.

It has been found that after operation for a certain length of time the heat-transfer surfaces of the decomposition vessel system acquire a solid, compact crust which reduces the rate of heat transfer. The principal component of this deposit which interferes with heat transfer consists of sodium aluminum silicate (hydroxylsodalith) and forms at a temperature up to about 180°-200°C. Above this temperature the titanium content of the crust becomes significant it reaches in individual cases to more than 50 percent titanium dioxide.

This invention concerns the problem of removal of the crust formed on heat-transfer surfaces in a system for extracting alumina from bauxite, where thermal decomposition is involved, and doing so economically, without damaging the reaction system.

SUMMARY OF THE INVENTION

It is an object of the present invention to remove the crust which forms on the heat exchanger in a system in which a bauxite suspension is subjected to thermal decomposition. It is a further object to carry out said removal quickly and with a minimum of labor, and without damage to said system.

In the process of extracting bauxite with sodium aluminate liquor where the suspension is subjected to thermal decomposition, a tightly adherent crust forms on the surfaces of the heat exchanger. Where thermal decomposition is carried out at above 180°-200°C, the crust may contain $TiO_2$ in amounts exceeding 50 percent; this part of the crust is relatively insoluble and is best removed with a mixture of hydrofluoric and hydrochloric acids. Part of the crust goes into solution and part into suspension.

Where the decomposition is carried out at temperatures below 180°-200°C, or in those parts of the system where the temperature stays below 180°-200°C, the crust consists mainly of sodium aluminum silicate (hydroxyl sodalith) which can be removed with hydrochloric or sulfuric acid.

Where the deposit is formed in carrying out the decomposition reaction at a temperature below about 180°C to 200°C, then a mixture of hydrochloric and sulfuric acids will suffice.

The deposit can also be broken from the walls by means of a jet of water, preferably containing a surface-tension reducing agent, applied at a pressure of 100-1000 atm. For this purpose it is desirable that the temperature of the heat-transfer surfaces be raised to about 300°C prior to impingement with the water spray. Temperature stresses will then help to detach the crust from the walls.

DESCRIPTION OF THE PREFERRED EMBODIMENTS

In the extraction of bauxite with sodium aluminate liquor, where thermal decomposition is used, an adherent crust forms on the heat transfer surfaces. We have found that the crust which is deposited when operating above 180°-200°C has a high titanium content; this crust can be removed with the help of an acid mixture consisting of hydrochloric and hydrofluoric acids where the concentration of the acids in the mixture is 2-8 percent for the hydrochloric acid and 2-10 percent for the hydrofluoric acid; the acids are applied at elevated temperature, preferably at about 80°C. The deposit which is formed below the above temperature range can, on the contrary, be removed with hydrochloric or sulfuric acids.

A preferred mixture of acids for treatment of deposits formed above 180°-200°C consists of about 3 percent hydrochloric acid and about 3 percent hydrofluoric acid. For deposits formed below 180°-200°C, the concentration of the acid used (hydrochloric or sulfuric) is preferably between 5 and 10 percent. It is especially desirable to have relative motion between the crust and the mixture of acids. The velocity can be adjusted by changing the rate at which the mixture of acids is pumped through the vessel or through the individual sections of the vessel. With this objective, the decomposition vessel is so designed that every part of the crust can be washed with equal effectiveness. This implies that there is no dead space. The predominantly piston flow which prevails in a tubular decomposition vessel promotes cleansing when proceeding according to the invention; since no mixing of the fresh with the exhausted acid occurs, any section of the tube can be cleaned as a separate operation. Furthermore, at a sufficiently high rate of flow the disintegrated crust can forthwith be removed from the system.

Another method of removal of the deposit is by means of a high pressure water to break up the crust and simultaneously flush it out of the tube. For this purpose it is desirable that the water be sprayed on the crust using a pressure of 100-1000 atm. If necessary, a surface tension reducing agent should be added to the water. Suitable materials are the strongly alkaline compounds such as sodium carbonate or sodium phosphate to which small quantities of suitable surface active agents such as alkyl sulfonates, carboxylic acid esters or salts of organic phosphoric acid esters are added. This method of operation should preferably be used when the crust is brittle as a result of temperature stress. For this purpose the tube should be heated to about 300°C before introduction of the water jet. The introduction of the water jet will then cause the crust to break away from the wall.

In a tubular decomposition vessel the various types of crust are clearly separated from each other in different sections of the system and it is desirable to treat them in various ways in order to clean them out. It is frequently desirable to treat the entire system with dilute hydrochloric or sulfuric acid and then to treat those portions to which crust still adheres with a hyrofluoric acid-hydrochloric acid mixture. In the example given below the various methods of operation already described can be suitably combined with each other. As a result of the relatively small volume of tubular decomposition vessels, the cleaning operation requires only relatively small quantities of acids and can be completed in a relatively short time. The expenditure for labor is extremely small.

EXAMPLE

A tubular vessel for the decomposition of bauxite is found to have a 3–5 mm deposit of a difficulty soluble material on its heat transfer surfaces. This portion of the system is treated with a mixture of acids at 80°C where the mixture of acids consists of about 3 percent hydrochloric acid and 5 percent hydrofluoric acid to which has been added 2.5 Kg of inhibitor per cubic meter.

This portion of the system is filled with the acid mixture which is pumped through the system for 5–6 hours at a stream velocity of 1–1.5 m/sec. The acid mixture which holds the deposit partly in solution and partly in suspended form is removed from the system. The system is then flushed out as usual and neutralized.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for the removal of deposits of sodium alunimum silicate containing substantial proportions of titanium dioxide that have formed on the internal surfaces of reaction vessels that have been used for the production of aluminum by treatment of bauxite with sodium aluminate liquor at temperatures above 180°C, which comprises contacting the said deposits with a hot mixture of dilute hydrochloric and hydrofluoric acids for a period sufficient to loosen and remove the said deposits from the internal surfaces of the reaction vessels.

2. A process as defined in claim 1, in which the temperature of the mixture of acids is approximately 80°C.

3. A process as defined in claim 1, in which the mixture of acids is passed in a continuous stream through the reaction vessel at a flow rate of between 1 and 1.5 meters per second for a period between five and six hours.

4. A process as defined in claim 1 in which the deposit on the internal surfaces of the reaction vessel contains at least 50 percent by weight of titanium dioxide.

5. A process as defined in claim 1 in which a stream of dilute hydrochloric or sulfuric acid is passed through the reaction vessel to loosen deposits consisting essentially of sodium aluminum silicate prior to introducing the stream of the mixture of hydrochloric and hydrofluoric acids.

6. A process as defined in claim 1 in which the mixture of acids contains between two and eight percent by weight of hydrochloric acid and between two and ten percent by weight of hydrofluoric acid.

7. A process as defined in claim 1 in which the mixture of acids contains approximately three percent by weight of each of hydrochloric and hydrofluroic acids.

* * * * *